United States Patent [19]
Fishel

[11] Patent Number: 5,486,400
[45] Date of Patent: Jan. 23, 1996

[54] CHRISTMAS TREE ORNAMENT PROTECTOR

[76] Inventor: James D. Fishel, 8313 Crown Court Rd., Alexandria, Va. 22308

[21] Appl. No.: 348,206

[22] Filed: Nov. 28, 1994

[51] Int. Cl.⁶ .................................................. B32B 3/12
[52] U.S. Cl. .............................. 428/116; 428/178
[58] Field of Search ............... 428/17, 116, 178

[56] References Cited

U.S. PATENT DOCUMENTS

| | | | |
|---|---|---|---|
| 2,748,516 | 6/1956 | McClusky | 428/17 X |
| 2,868,255 | 1/1959 | Fancher | 206/423 |
| 3,310,091 | 3/1967 | Geisen et al. | 428/52 X |
| 3,729,039 | 4/1973 | Walsh | 206/423 |
| 3,750,731 | 8/1973 | Brimmell | 206/423 |
| 3,924,669 | 12/1975 | Price | 383/121 X |
| 3,954,129 | 5/1976 | Rudell et al. | 428/13 X |
| 4,384,604 | 5/1983 | DeLaura et al. | 428/15 X |
| 4,602,664 | 7/1986 | Hullen | 428/131 X |
| 4,799,520 | 1/1989 | Blackburn et al. | 206/423 |
| 4,948,116 | 8/1990 | Vaux | 428/178 X |
| 5,082,712 | 1/1992 | Starp | 428/178 X |

*Primary Examiner*—Henry F. Epstein
*Attorney, Agent, or Firm*—Willian Brinks Hofer Gilson & Lione

[57] ABSTRACT

A Christmas tree ornament protector is provided which absorbs the impact of ornaments falling from the branches of a Christmas tree and provides a means of preventing ornaments from rolling or bouncing onto the floor, and breaking. The ornament protector has a two-layer surface where the top layer can have a decorative covering suitable for use in conjunction with the display of a Christmas tree as a base under the tree and a bottom layer comprised of a series of peaks-and-valleys which protect falling ornaments from breaking on impact and further prevents the ornaments from rolling onto the floor and breaking.

9 Claims, 3 Drawing Sheets

CHRISTMAS TREE ORNAMENT PROTECTOR

BACKGROUND OF THE INVENTION

1. Field of the Invention

This invention relates to a Christmas tree ornament protector (i.e skirt) which provides an absorbent impact layer for falling ornaments to prevent them from breaking and also serves as a decorative base.

2. Description of Related Art

The display of natural and artificial evergreen trees in and around the Christmas holidays and other holiday seasons is an old custom. As is well known, such trees are generally erected in the living and working areas of homes and other buildings.

In recent years there has been a burgeoning business in creating heirloom Christmas ornaments. These ornaments are often made of very fragile and expensive materials.

When natural Christmas trees are displayed they dry out which causes the bark, needles, branches and other portions of the tree to fall off or severely bend. In the case of artificial Christmas trees, improper assembly or aging over many years of use can weaken limbs and cause them to fall off. Small children and pets are also prone to pulling on the limbs, be they real or artificial. In any of these cases, fragile ornaments are subject to breakage and other damage as they fall from the tree onto the floor surface.

Although various methods have previously been employed in an attempt to confine or prevent dropping needles, tinsel, or ornaments from damaging the floor or rug area around the tree, such methods have generally entailed the use of large pieces of cloth or fabric which are placed around the base of the tree simply to catch the falling debris, etc. The following U.S. Patents provide Christmas tree wraps or floor coverings which serve as needle catchers and the like:

U.S. Pat. No. 2,868,255
U.S. Pat. No. 3,729,039
U.S. Pat. No. 3,750,731
U.S. Pat. No. 3,924,669
U.S. Pat. No. 3,954,129
U.S. Pat. No. 4,384,604
U.S. Pat. No. 4,799,520.

Such coverings are normally made of a single thin layer of material. However, none of the prior art skirts provide a protective surface designed to prevent falling ornaments from breaking upon impact or from bouncing off and then breaking upon impact. The purpose of the prior art devices has been to provide a reservoir to catch falling debris to prevent it from damaging floors and make the tree and debris easy to dispose of. However, none of the prior art devices provide the advantage of not only absorbing the impact of the falling ornament, but also of safely securing the fallen ornaments so that they will not roll or bounce onto the floor.

SUMMARY OF THE INVENTION

According to the invention, a Christmas tree ornament protector is provided which absorbs the impact of ornaments falling from the branches of the Christmas tree and provides a means for ornaments to lodge on the protector to avoid breakage when an ornament rolls and bounces. The protector has a two-layer surface where the top layer can have a decorative covering suitable for use in conjunction with the display of a Christmas tree as a base under the tree, and a bottom layer comprised of a series of supple peaks-and-valleys which protect falling ornaments from breaking and bouncing.

As pointed out above, the bottom layer is a pattern of peaks-and-valleys which resemble a honeycomb structure similar to an egg carton or enlarged "bubble wrap". This honeycomb structure absorbs the fall of the ornaments which lodge in the valleys of the structure to prevent them from rolling or bouncing onto the hardwood floor, carpet or rug and then being damaged.

Preferably, the top layer having the decorative motif and the bottom layer will be connected by some type of fastening means such as Velcro™ so that the top layer can be changed to various holiday motifs so that the ornament protector can be used year round.

As pointed out in greater detail below, the peaks-and-valleys pattern of the bottom layer provides the important advantage of not only absorbing the fall of the ornament, but of safely securing the fallen ornaments so that they will not then roll or bounce onto the floor and break.

DETAILED DESCRIPTION OF THE PREFERRED EMBODIMENTS

Figure 1:
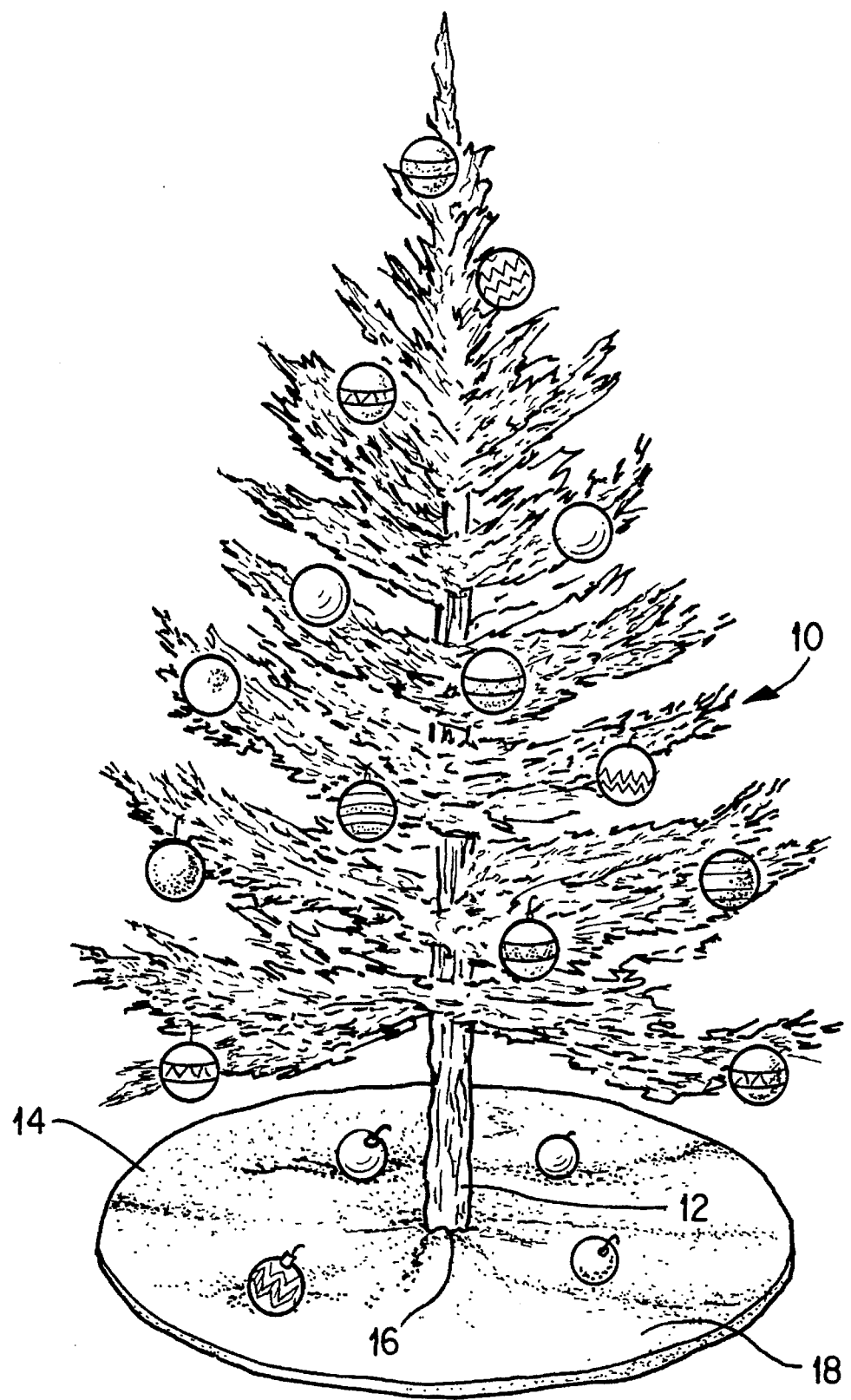
FIG. 1 is a side elevation of an erected Christmas tree wherein the ornament protector is enveloping the base and supporting stand while the tree is being displayed.

Turning now to the drawings, FIG. 1 shows a Christmas tree 10, which can be either natural or artificial, having a trunk 12. The tree 10 is supported by a conventional tree stand (not shown) attached to the trunk 12 which maintains the tree in an upright position. The ornament protector 14 is positioned about the trunk 12 and above the stand. The collar portion 16 of the ornament protector 14 is sized such that it can receive a trunk as large as that can be held by a standard stand. In the alternative, the collar can be fitted with a drawstring (not shown) so that it can be tied tightly around the trunk 12. Such a drawstring attachment is well known in the art. In another alternative, the user can measure the trunk of the Christmas tree with which the invention will be used and cut an opening in the ornament protector 14.

As shown, the ornament protector 14 is generally circular, having a top layer 18 that is suitable for use as a decorative base on which Christmas snow, a nativity scene, Santa or other decorative motif can be displayed. The top layer 18 can be made of cloth, plastic, or other suitable material. Although shown as having a circular shape, the ornament protector 14 can be of any shape, such as a star, square or other suitable shape.

The ornament protector 14 is preferably of an area such that it completely underlies the branches of the tree, as shown in FIG. 1, and extends outwardly beyond the body of the tree an amount sufficient so that falling ornaments will land on the ornament protector 14. The ornament protector 14 can be made in various sizes so that its circumference will be greater than the circumference of the branches of the tree.

Figure 2:
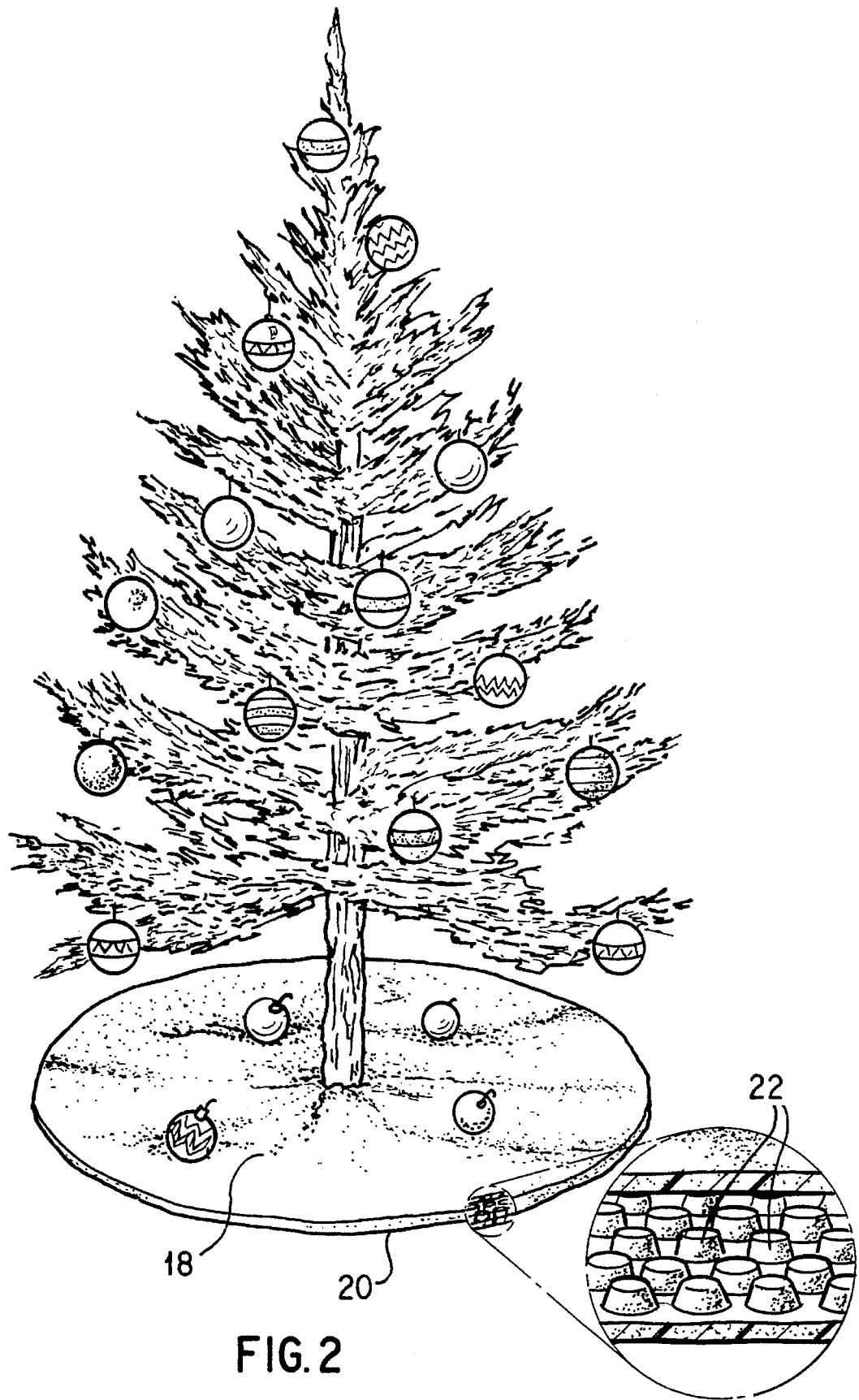
FIG. 2 is a partial cross sectional view of the ornament protector showing an exploded view of the bottom layer.

As best shown in FIG. 2, a bottom layer 20 is adjacent to the top layer 18 and essentially provides a supple and springy lining to the top layer 18. The bottom layer 20 provides a series of peaks-and-valleys 22 that serve to absorb the fall of the tumbling ornaments and to keep them from rolling or bouncing onto the floor or rug and breaking. The bottom layer 20 is made of a honeycomb structure such as a rounded egg carton or enlarged "bubble-wrap," or other shock-absorbent equivalent.

The top layer 18 and bottom layer 20 are secured by a plurality of fastening means (not shown) which hold the top and bottom layers together. Preferably some type of hook and loop closure, such as Velcro™ or the like, is used to secure the top and bottom layers, but any other type of fastener such as a zipper, snaps, laces, hooks and eyes, and ties may be employed. Since the top and bottom layers are separable, the bottom layer 20 can be saved and reused from year to year even when the top layer 18 is made of a disposable material or is interchanged with another design.

The thickness of the bottom layer 20 and the heights of the peaks-and-valleys 22 should be such that an ornament falling from the top of the tree will have sufficient absorbent material to prevent it from breaking on impact and allow the ornament to lodge in the material to prevent rolling or bouncing. Merely by way of example, the bottom layer 20 should range in thickness from about 2" to 4" in the case of a six-foot Christmas tree having conventional glass ornaments. The thickness of the bottom layer 20 should increase depending upon the height of the tree and the size of the ornaments. Thus, the ornament protector 14 can be made in a range of diameters and thicknesses to accommodate various trees and ornaments. The taller the tree, the thicker the ornament protector. Additionally, the larger the ornaments, the greater the spacing between the peaks-and-valleys.

In use, when an ornament falls from the tree, the peak would be slightly compressed and absorb the impact of the ornament and prevent it from breaking. The ornament would then roll and come to rest in one of the valleys. The space between the peaks will be such that the valleys provide a recess area where part of the ornament can lodge and rest securely. In the alternative, a falling ornament might fall directly into a recessed valley where it will lodge and be held securely to prevent the ornament from rolling onto the floor.

Figure 3:
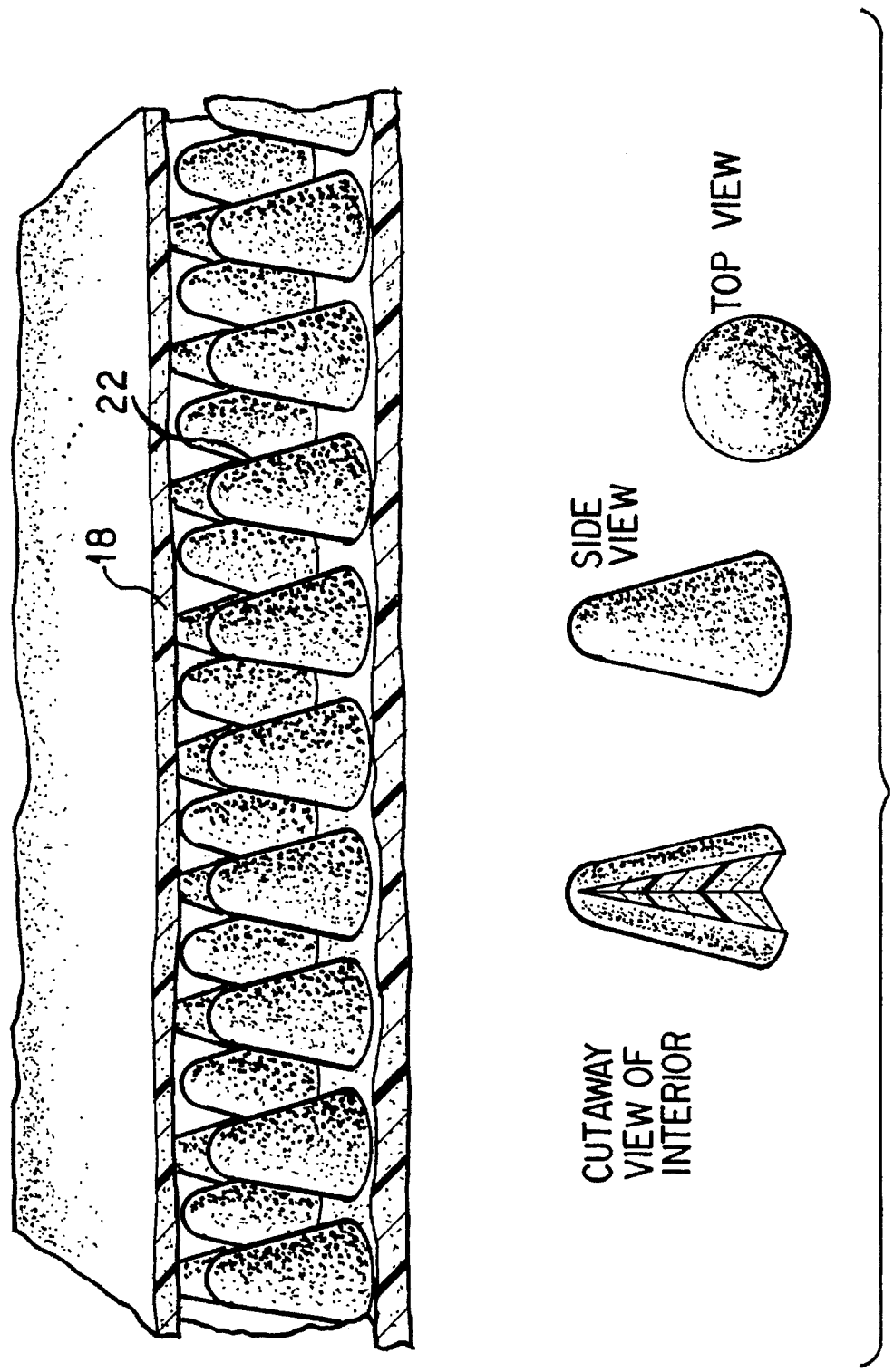
FIG. 3 is a partial cross sectional view of an alternate embodiment of the bottom layer.

In a variation on the invention the peaks-and-valleys can be varied in height and spacing so that both large and small ornaments can lodge and rest securely on the ornament protector. As shown in FIG. 3, the peaks-and-valleys pattern may be such that the top of the peaks form an undulating or rolling hills type of effect. In this embodiment the peaks are of graduated heights so that a falling ornament will roll toward the smaller peaks.

Other variations on the embodiments described above are possible. For example, the bottom layer 20 can be made of a series of concentric circles encircling the trunk 12. Using this pattern the falling ornaments will hit the higher portion of the circle and then come to rest in the valleys between concentric circles. Additionally, any number of peak and valleys patterns could be used for the bottom layer 20.

In another variation, the top layer 18 can be a disposable Christmas tree wrap that can be removed from the bottom layer 20 at the end of the display period and used to bag and dispose of the Christmas tree. Such a Christmas tree wrap is disclosed in U.S. Pat. No. 3,954,129 issued to Ruddell et al.

The embodiments described above provide a number of significant advantages. Because the ornament protector is a two layer structure having a supple "peak and valley" bottom layer it absorbs the fall of the ornament preventing breakage on impact. Further, because of the peaks-and-valleys of the supple bottom layer the ornaments to come to rest securely on the ornament protector 14 and do not roll or bounce onto the floor also preventing breakage. Additionally, the ornament protector provides a decorative cushion which covers the stand and prevents the ornaments from striking the stand.

Of course, it should be understood that a wide range of changes and modifications can be made to the preferred embodiments described above. It is therefore intended that the foregoing detailed description be regarded as illustrative rather than limiting and that it be understood that it is the following claims, including all equivalents, which are intended to define the scope of this invention.

What is claimed:

1. A Christmas tree ornament protector comprising:
   a top layer having an opening for receiving a trunk of a Christmas tree;
   a bottom layer adjacent to said top layer, said bottom layer made of a shock absorbent material and also having an opening for receiving said trunk; and
   a plurality of fasteners for attaching said top and bottom layers.

2. The Christmas tree ornament protector of claim 1, wherein said shock absorbent material of said bottom layer is formed of a series of peaks-and-valleys.

3. The Christmas tree ornament protector of claim 2, wherein said peaks-and-valleys undulate.

4. The Christmas tree ornament protector of claim 1, wherein said shock absorbent material of said bottom layer is formed in a honeycomb pattern.

5. The Christmas tree ornament protector of claim 1, wherein said shock absorbent material of said bottom layer is formed of bubble-wrap.

6. The Christmas tree ornament protector of claim 1, wherein said top layer is covered with a decorative motif.

7. The Christmas tree ornament protector of claim 1, wherein said top layer is a bag for disposing of said tree.

8. A Christmas tree ornament protector comprising:
   a top layer of an area such that it completely underlies the branches of said tree and extends outwardly beyond the body of the tree an amount sufficient to catch falling ornaments;
   a bottom layer of the same area as said top layer, said bottom layer made of a shock absorbent material formed into peaks-and-valleys for catching falling ornaments; and
   a plurality of fasteners which secure said top layer to said bottom layer, said fasteners are such that said top layer can be removed from said bottom layer and replaced with a different top layer.

9. A device for protecting a frangible article from damage by falling from an elevated position comprising:
   a top layer of an area sufficient to catch falling said articles;
   a bottom layer of the same area as said top layer, said bottom layer made of a shock absorbent material formed into peaks-and-valleys for catching said articles; and
   a plurality of fasteners which secure said top layer to said bottom layer, said fasteners are such that said top layer can be removed from said bottom layer and replaced with a different top layer.

* * * * *